(12) United States Patent
Ohashi et al.

(10) Patent No.: US 7,374,145 B2
(45) Date of Patent: May 20, 2008

(54) RESERVOIR TANK HAVING A BRACKET INTEGRATED THEREWITH

(75) Inventors: Tatsuya Ohashi, Okazaki (JP);
Yasuhisa Hirano, Okazaki (JP);
Yoshimasa Hayashi, Okazaki (JP);
Yasushi Kira, Okazaki (JP)

(73) Assignee: JTEKT Corporation, Osaka (JP)

( * ) Notice: Subject to any disclaimer, the term of this patent is extended or adjusted under 35 U.S.C. 154(b) by 124 days.

(21) Appl. No.: 10/796,144

(22) Filed: Mar. 10, 2004

(65) Prior Publication Data

US 2004/0238247 A1     Dec. 2, 2004

(30) Foreign Application Priority Data

Mar. 12, 2003    (JP) .............................. 2003-065923

(51) Int. Cl.
*F16M 13/00*     (2006.01)
(52) U.S. Cl. ...................... 248/562; 280/831; 248/566
(58) Field of Classification Search ................ 248/562, 248/566, 608, 609, 603; 280/834, 831, 124.125, 280/660, 690, 788, 830; 267/292, 140.11, 267/141, 141.3, 141.4
See application file for complete search history.

(56) References Cited

U.S. PATENT DOCUMENTS

| | | | | | |
|---|---|---|---|---|---|
| 1,321,857 | A | * | 11/1919 | Snell | 280/834 |
| 1,611,906 | A | * | 12/1926 | Gurney | 280/834 |
| 1,638,782 | A | * | 8/1927 | Paton | 123/192.1 |
| 4,223,899 | A | * | 9/1980 | Krieger | 280/834 |
| 5,890,740 | A | * | 4/1999 | Kami | 280/834 |
| 6,059,252 | A | * | 5/2000 | Emmann et al. | 280/503 |
| 6,820,908 | B1 | * | 11/2004 | Tousi et al. | 296/35.1 |
| 6,910,716 | B2 | * | 6/2005 | Kurayoshi et al. | 280/835 |

FOREIGN PATENT DOCUMENTS

| | | |
|---|---|---|
| DE | 100 11 944 A1 | 9/2001 |
| JP | 54-170540 | 12/1979 |
| JP | 6-16172 | 3/1994 |
| JP | 8-258668 | 10/1996 |
| JP | 11-034808 | 2/1999 |
| JP | 11-217061 | 8/1999 |
| JP | 11-301420 | 11/1999 |
| JP | 2001-213280 | 8/2001 |
| JP | 2002-500591 | 1/2002 |
| JP | 2002-127875 | 5/2002 |
| JP | 2002-200969 | 7/2002 |

* cited by examiner

*Primary Examiner*—A. Joseph Wujciak, III
(74) *Attorney, Agent, or Firm*—Oblon, Spivak, McClelland, Maier & Neustadt, P.C.

(57) ABSTRACT

A reservoir for holding fluid of a vehicle includes a tank and two brackets integrated with the tank to install the tank in the vehicle in an upper portion of the engine compartment. An attaching portion is arranged with each of the brackets to be fixed to the vehicle. A connecting portion is arranged with each of the brackets to connect the attaching portion to the tank. One of the connecting portions has a notch that is deformed or fractured so that the tank can be moved with respect to the vehicle to absorb an impact force that acts on the tank when the tank receives an impact force larger than a predetermined value. The attaching portion has a plurality of rib portions that is deformable or fracturable so that the tank can be moved with respect to the vehicle to absorb force that acts to the tank when the tank receives a force larger than a predetermined value.

7 Claims, 5 Drawing Sheets

RESERVOIR TANK HAVING A BRACKET INTEGRATED THEREWITH

INCORPORATION BY REFERENCE

The present application claims priority under 35 U.S.C. §119 to Japanese Patent Application No. 2003-65923, filed on Mar. 12, 2003. The contents of that application are incorporated herein by reference in their entirety.

BACKGROUND OF THE INVENTION

1. Field of the Invention

This invention relates to a reservoir that a bracket is integrated with, more particularly, a reservoir that is installed into engine compartments of vehicles.

2. Discussion of the Background

Japanese Utility-Model Publication No. 6-16172 discloses a reservoir for various oils such as power steering oil for vehicles. This reservoir comprises a tank made of synthetic resin and a bracket made of metal to attach the tank to a body of the vehicle. A reservoir in which a tank and a bracket are integrally molded of synthetic resin is thus known.

Meanwhile, Japanese Laid-Open Patent Application No. 8-258668 discloses a method for protecting a pedestrian who is hit by a vehicle. The pedestrian is thrown up by a front bumper of the vehicle and impacts the engine hood according to the method. Thus, the shock of the pedestrian upon collision with the engine hood is relieved by deformation of the engine hood. That is, the engine hood is deformed downwardly by the collision with the pedestrian, and functions as a shock absorber. Generally, a reservoir is arranged in an upward manner into an engine compartment, because of easy access for oil maintenance, and is rigidly fixed to a body of the vehicle. Therefore, the deformed engine hood collides with the reservoir, and further deformation of the engine hood is prevented by the reservoir. This means that ability of the engine hood to act as a shock absorber for the pedestrian is deteriorated.

SUMMARY OF THE INVENTION

In view of the foregoing, it is an object of the present invention to provide improved reservoirs. In order to achieve the above and other objects, a first aspect of the present invention provides a reservoir to hold fluid for a vehicle. The reservoir comprises a tank for holding the fluid, a bracket integrated with the tank to install the tank in the vehicle, and an attaching portion arranged with the bracket. The attaching portion is configured so that the tank can be moved for the vehicle to absorb a force that acts to the tank when the tank receives force larger than a predetermined value.

A second aspect of the present invention provides another reservoir for a fluid of a vehicle. The reservoir comprises a tank holding the fluid, a bracket integrated with the tank to install the tank in the vehicle, an attaching portion arranged with the bracket to be fixed to the vehicle, and a connecting portion arranged with the bracket to connect the attaching portion to the tank. The connecting portion is configured so that the tank can be moved for the vehicle to absorb a force that acts on the tank when the tank receives a force larger than a predetermined value.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

First Embodiment

Figure 1:
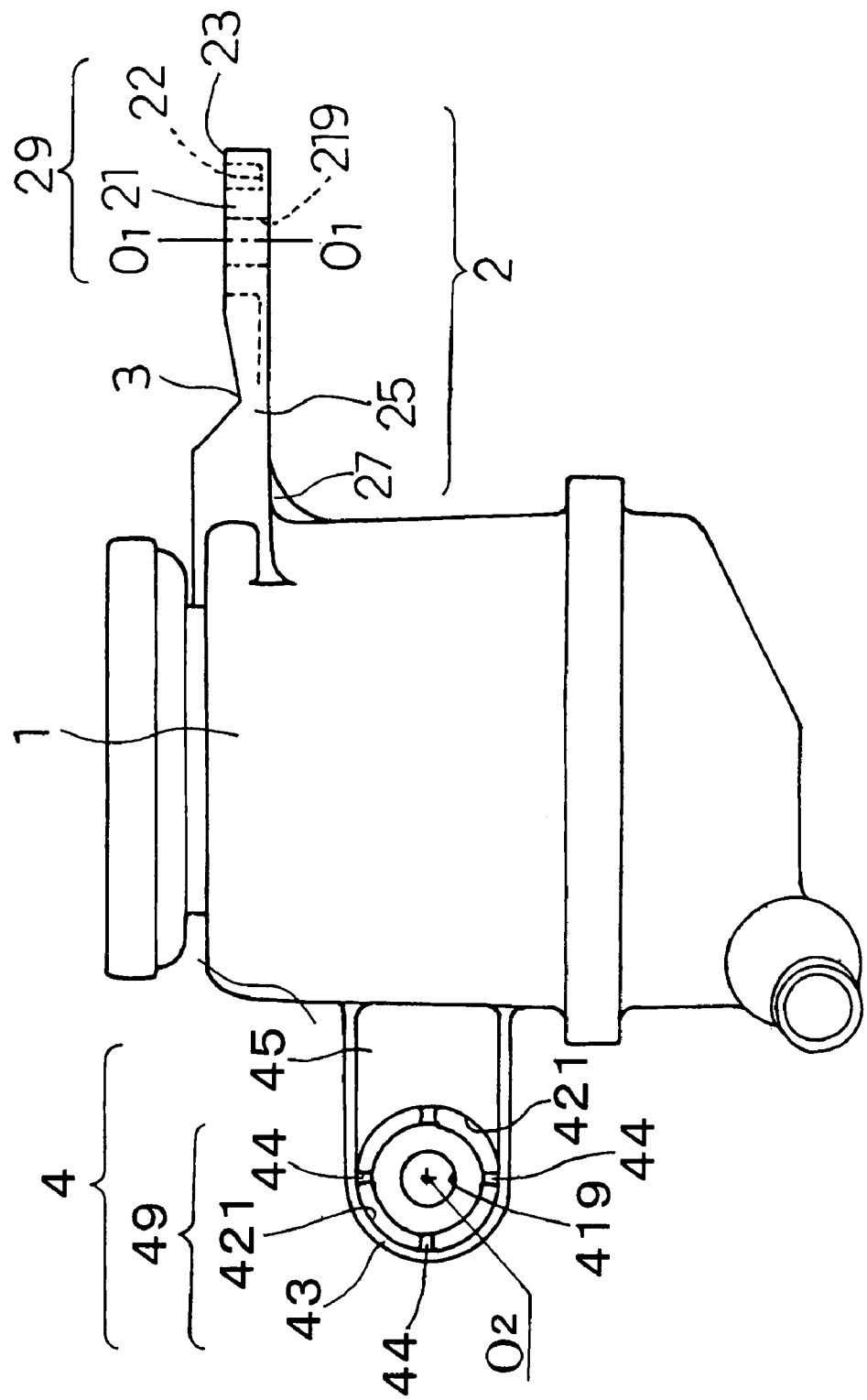
FIG. 1 is a side view of a reservoir according to a first embodiment of the present invention.
Figure 2:
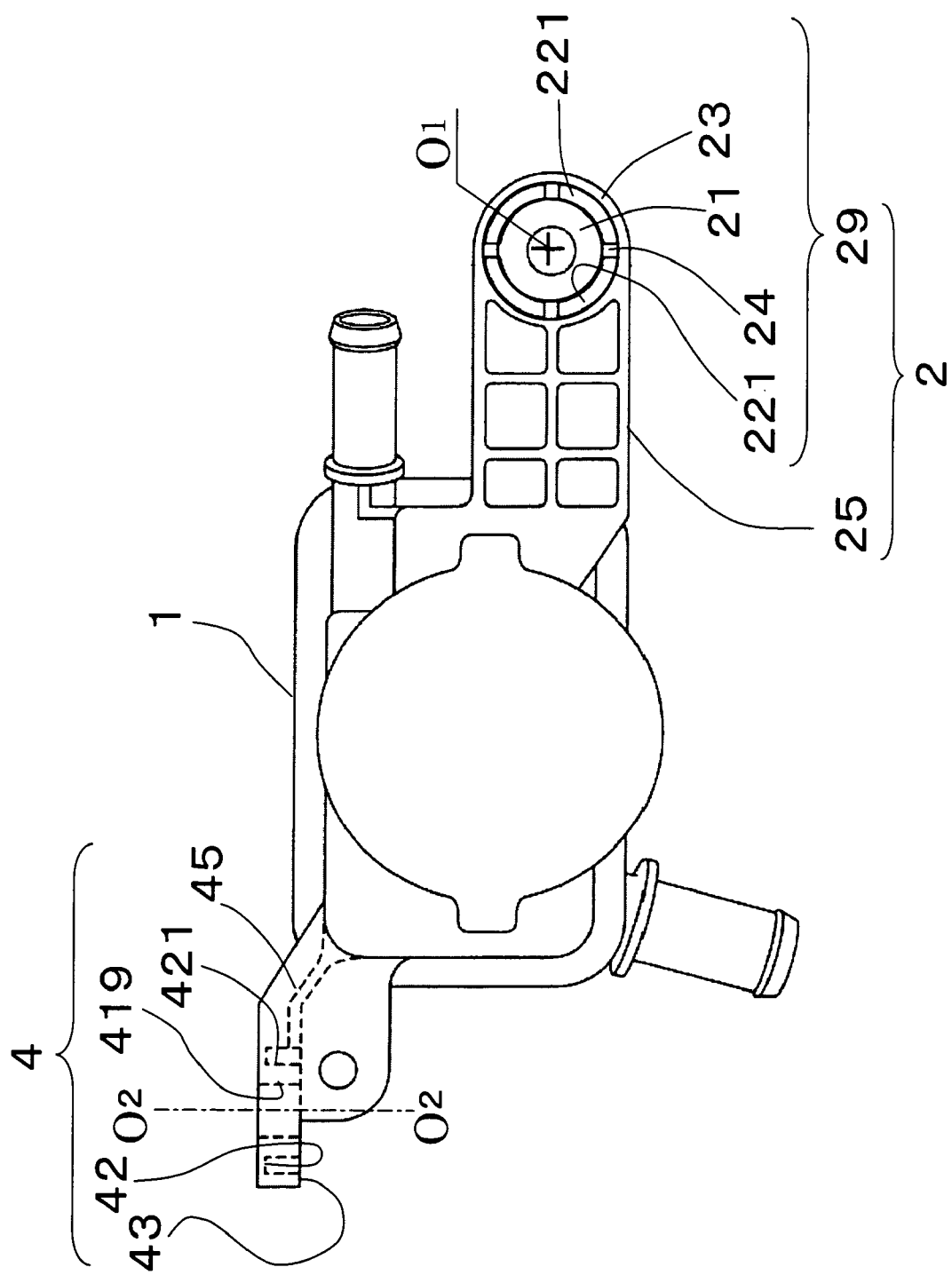
FIG. 2 is a plane view of the reservoir according to the first embodiment.
Figure 3:
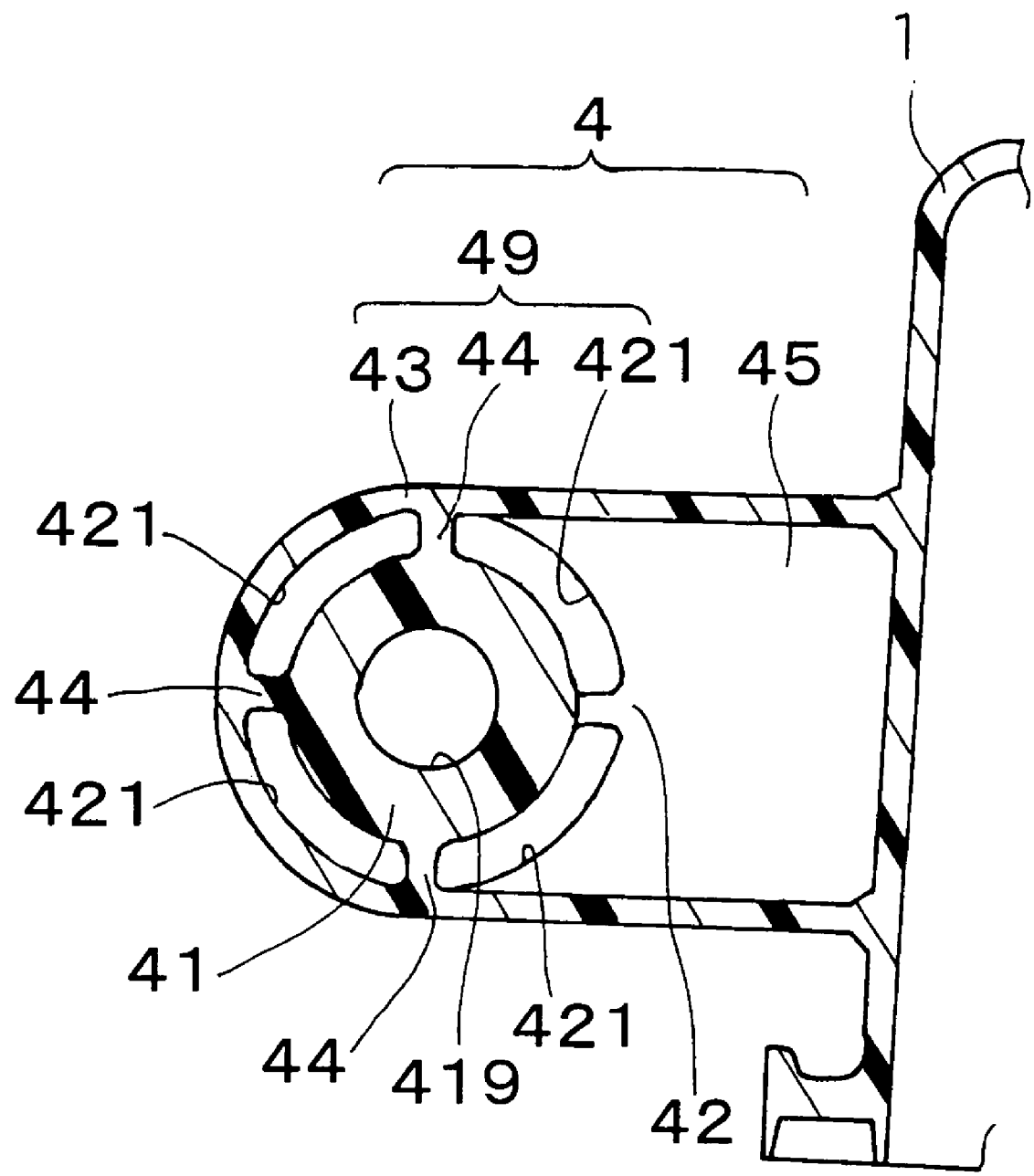
FIG. 3 is an enlarged cross-sectional view of a second attaching portion of the reservoir according to the first embodiment.

A reservoir according to a first embodiment of the present invention will now be described with reference to FIGS. 1-4. The reservoir that is arranged at an upper part in an engine compartment of a vehicle as one of the components of a power steering apparatus which mainly comprises a tank 1 and first and second brackets 2, 4. Oil for the power steering apparatus is stored into the tank 1. The reservoir is fixed to a body of the vehicle in the engine compartment by the brackets 2, 4 and by bolts 9 as fixtures. The material used for the tank 1 and brackets 2, 4 is a synthetic resin, and the brackets 2, 4 are integrally molded with the tank 1.

The first bracket 2 is horizontally formed on an upper portion of the tank 1. The first bracket 2 comprises a first attaching portion 29 and a first connecting portion 25 that connects the tank 1 to the first attaching portion 29. A through hole 219 in which the bolt 9 is inserted is formed in the center of the first attaching portion 29. Plural arc-shaped concavities (four in this embodiment) 221 are formed on the first attaching portion 29 around the through hole 219 concentrically. As the result, a boss portion 21 around the through hole 29, a flange portion 23 located at the outside of the arc-shaped concavities 221 and rib portions 24 connecting the flange portion 23 to the boss portion 21 are formed on the attaching portion 29. The flange portion 23 is continued to the tank 1 along both edges of the first connecting portion 25 and the middle of them. The first connecting portion 25 is separated by the continued flange portions and ribs connecting them so that plural concavities (six in this embodiment) are formed on the first connecting portion 25. The above-described first bracket 2 functions as a shock absorber for force acting on the reservoir. That is, when the tank 1 receives an excessive force (larger than a predetermined value) of its side direction, plastic deformation furthermore subsidiary fracture occur at the rib portions 24 and plane portions 22 that are thin bottoms of the arc-shaped concavities 221, which are located between the flange portion 23 and the boss portion 21. The excessive force that the tank 1 receives is absorbed by the plastic deformation or the subsidiary fracture of the rib portions 24 and the thin plane portions 22.

Meanwhile, as showing by FIG. 1, a notch 3 is formed at a middle of the first connecting portion 25. That is, the section modules of the connecting portion 25 in a side view thereof (the longitudinal direction) are decreased at the portion where the notch 3 is formed. The longitudinal location of a vertex of the notch 3 accords with the location of one of the ribs defining the concavities on the first connecting portion 25. Therefore, according to the first bracket 2, the first connecting portion 25 functions as a shock absorber for a force applied in a direction that is parallel to the line $O_1$-$O_1$. That is, when the tank 1 receives excessive force (larger than a predetermined vale) in an up and down direction, plastic deformation of the subsidiary fracture occurs at notch 3 of the first connecting portion 25. The excessive force that the tank 1 receives is absorbed by the plastic deformation or the deformation of subsidiary fracture at the notch 3 of the first connecting portion 25. Further, because the section modules of the connecting portion 25 are small at the notch 3, stress concentration occurs at the notch 3 rather than a root 27 of the first connecting portion 25. Therefore, not the root 27 but instead the notch 4 of the first connecting portion is fractured by the excessive force. If the connecting portion 25 is fractured at the root 27, the tank 1 also may be broken up. Breakage of the tank 1 causes of oil leak. However, according to the above-described first bracket 2, the connecting portion 25 is not fractured at the root 27. Therefore, an oil leak is prevented, even if the tank 1 received the excessive force.

Similarly, the second bracket 4 is vertically formed on a middle portion in the vertical direction and a side in the horizontal direction of the tank 1. The second bracket 4 comprises an second attaching portion 49 and a second connecting portion 45 that connects the tank 1 to the attaching portion 49. A through hole 419 in which the bolt 9 is inserted is formed in the center of the second attaching portion 49. Plural arc-shaped concavities (four in this embodiment) 421 are formed on the second attaching portion 49 around the through hole 419 concentrically. As the result, a boss portion 41 around the through hole 419, a flange portion 43 located at the outside of the arc-shaped concavities 421 and rib portions 44 connecting the flange portion 43 to the boss portion 41 are formed on the second attaching portion 49. The flange portion 43 is continued to the tank 1 along both edges of the connecting portion 45. The above-described second bracket 4 functions as a shock absorber for force acting on the reservoir. That is, when the tank 1 receives an excessive force (larger than a predetermined vale) in a side direction, plastic deformation of the subsidiary fracture occurs at the rib portions 44 and plane portions 42 that are thin bottom portions of the arc-shaped concavities 421, which are located between the flange portion 43 and the boss portion 41. The excessive force that the tank 1 receives is absorbed by the plastic deformation or by the subsidiary fracture of the rib portions 44 and the thin plane portion 42.

Figure 4:
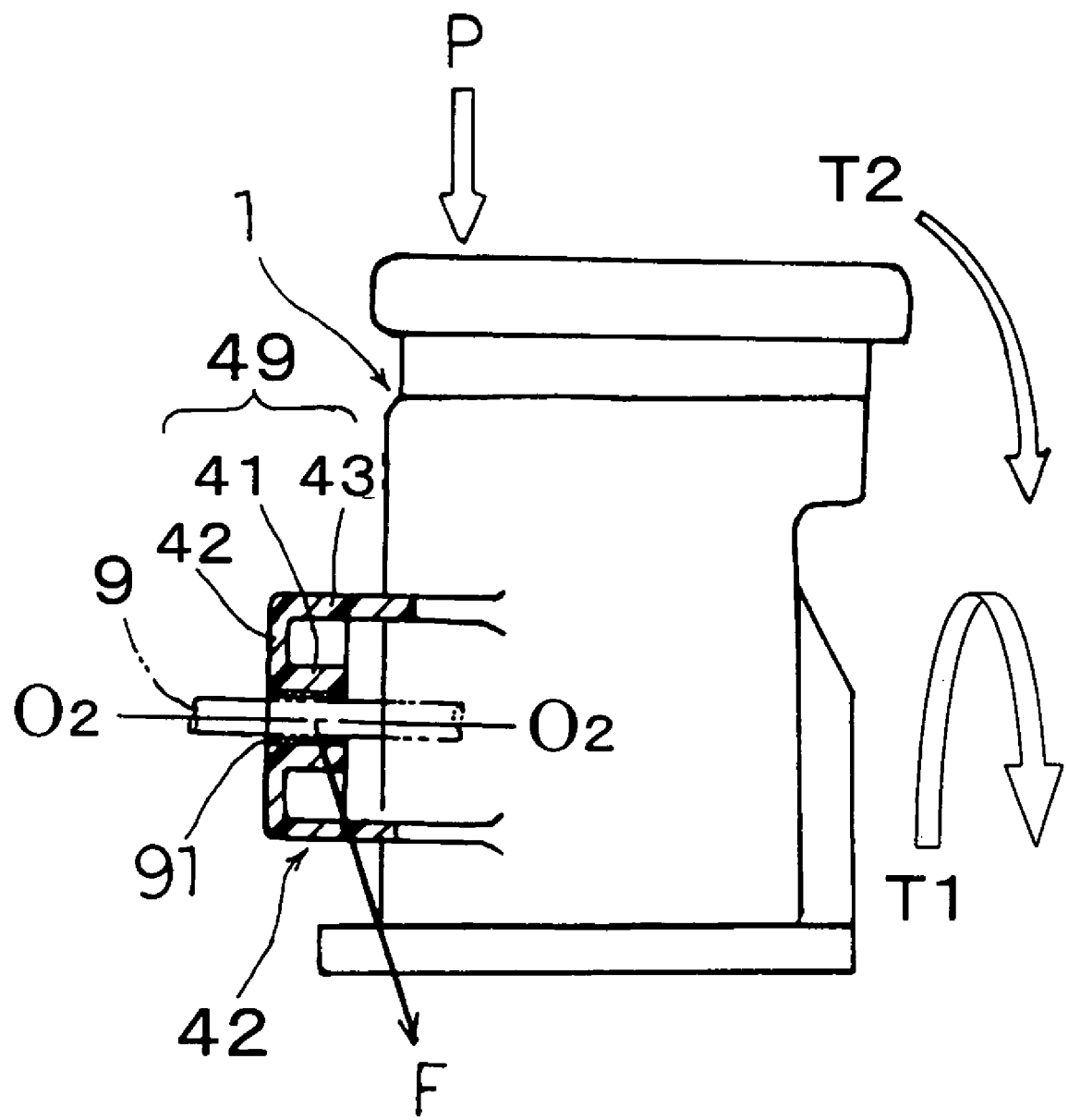
FIG. 4 is a front view of the reservoir to show forces acting to the reservoir.

With reference to FIG. 4, when an engine hood is downwardly deformed by being impacted by a pedestrian who is thrown by a front bumper of a vehicle, the impact strength that makes the engine hood become further deformed acts on the tank 1 as shown by an arrow P. Then, a force as shown by an arrow F acts at the second attaching portion 49. This directional force causes the plastic deformation or the subsidiary fracture of the rib portions 44 and the thin plane portions 42 because the tank 1 is turned around the line O2-O2 as shown an arrow T1 by the plastic deformation or the subsidiary fracture of the notch 3. As the result, the flange portion 43 which is connected with the tank 1 and the boss portion 41 which is fixed by the bolt 9 are able to move relatively in order to absorb the force acting on the reservoir. Furthermore, the P direction force causes the plastic deformation or the subsidiary fracture of the rib portions 24 and the thin plane portions 22 because the tank 1 is inclined in the direction as shown by an arrow T2. As the result, the flange portion 23 which is connected with the tank 1 and the boss portion 21 which is fixed by the bolt 9 is able to move relatively in order to absorb force acting on the reservoir.

According to the above-described reservoir, since the impact strength acting to the tank 1 is absorbed by the plastic deformation and subsidiary fracture of the first and/or the second brackets 2,4, the injury that the pedestrian who is thrown up the engine hood of the vehicle receives is reduced. Further, since the tank 1 can be turned because of the plastic deformation and subsidiary fracture of the first and/or the second brackets 2, 4, further deformation of the engine hood is not prevented by the tank 1. Namely, the tank 1 not only has a shock-absorbing function itself and but also does not prevent a shock-absorbing function of the engine hood. Therefore, the pedestrian who is hit by the vehicle and thrown up on the engine hood can be protected.

Second Embodiment

Figure 5:
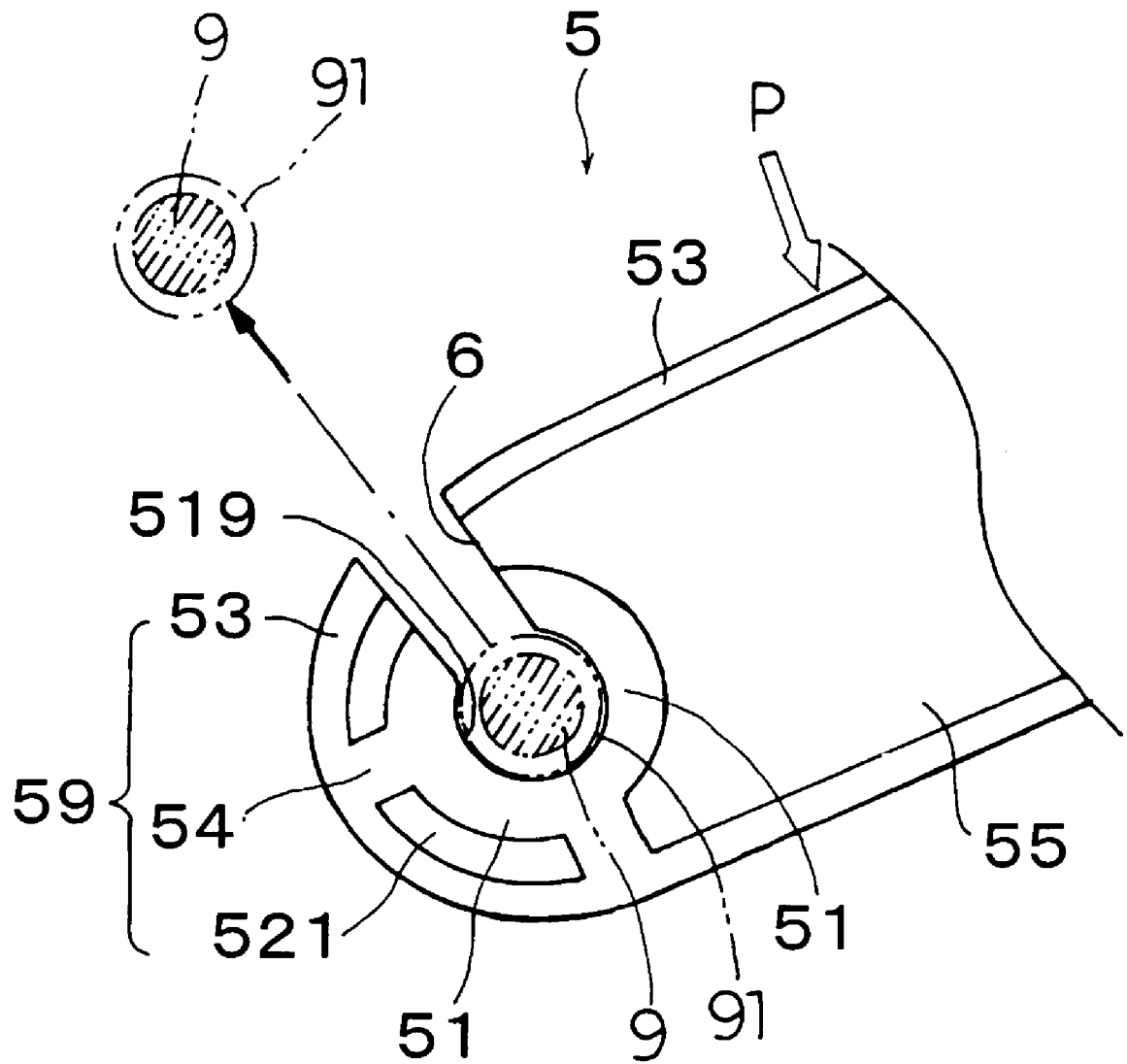
FIG. 5 is an enlarged partial view showing a second attaching portion of a reservoir according to a second embodiment of the present embodiment.

A reservoir as a second embodiment of the present invention will now be described with reference to FIG. 5. Because only the second bracket 4 of the first embodiment is different from the second embodiment, the second bracket 5 of the second embodiment will be described and a description for all other structure will be omitted. The second bracket 5 is vertically formed on middle in the vertical direction and side in the horizontal direction of the tank 1. The second bracket 5 comprises a second attaching portion 59 and a second connecting portion 55 that connects the tank 1 to the second attaching portion 59. A through hole 519 in which the bolt 9 is inserted together with a collar 91 is formed in the center of the second attaching portion 59. Plural arc-shaped concavities (two in this embodiment) 521 are formed on the second attaching portion 59 around the through hole 519 concentrically. As the result, a boss portion 51 around the through hole 519, a flange portion 53 located at the out side of the arc-shaped concavities 521 and rib portions 54 connecting the flange portion 53 to the boss portion 51 are formed on the second attaching portion 59. The flange portion 53 is continued to the tank 1 along both edges of the second connecting portion 45. A slit 6 that is continued to the through hole 59 is upwardly formed at the second attaching portion 59. The width of the slit 6 is defined to be slightly narrower than the diameter of the collar 91. The above-described second bracket 5 functions as a shock absorber for impact strength from an impact in the direction shown by the arrow P. That is, when the tank 1 receives excessive force (larger than a predetermined value) in the ups and down direction, thereof, the bolt 9 and the collar 91 are detached from the through hole 519. Then, the second attaching portion 59 is deformed so as to be widened such that the collar 91 goes through the same and the collar 91 slides on the slit 6. Therefore, the impact strength that the tank 1 receives is absorbed by the deformation of the attaching portion 59 and the friction between the collar 91 and walls defining the slit 6. Further, because the bolt 9 is detached from the through hole 519, the tank 1 is being able to be turned. Therefore, further deformation of the engine hood is not prevented by the tank 1.

Although both of the first and the second brackets 2, 4 that function as the shock absorber are used according to the first and the second embodiments, it is possible that only one of the first and second brackets 2, 4 is used. Further, it is possible that one of the first and the second brackets 2, 4 that functions as the shock absorber and another bracket that does not function as such shock absorber are used. Furthermore, although both of the attaching portion 29 and the connecting portion 25 of the first bracket 2 function as the shock absorber, it is possible that a bracket that functions as the shock absorber at only one of the attaching portion and connecting portion is used.

Obviously, numerous modifications and variations of the present invention are possible in light of the above teachings. It is thereby to be understood that within the scope of the appended claims, the present invention may be practiced otherwise than as specifically described herein.

What is claimed is:

1. A fluid reservoir comprising:
   a reservoir tank for holding a fluid therein, said tank being positionable at an upper portion of an engine compartment of a vehicle;
   a bracket connected with the tank and mountable to the vehicle; and
   an attaching portion arranged with the bracket and configured so that the tank is movable when the tank receives an impact force thereto larger than a predetermined value;
   wherein the attaching portion comprises a boss portion fixable to the vehicle and a flange portion arranged around the boss portion and connected to the tank;
   the flange portion being movable with respect to the boss portion so as to absorb the impact force to the tank,
   wherein the attaching portion comprises a plurality of rib portions connecting the boss portion to the flange portion, said rib portions being spaced apart circumferentially with cavities formed therebetween and lie in a same plane as said flange portion; and
   the rib portions are fracturable so that the tank is moved with respect to the vehicle when the tank is impacted.

2. A fluid reservoir comprising:
   a reservoir tank for holding a fluid therein, said tank being positionable at an upper portion of an engine compartment of a vehicle;
   a bracket connected with the tank and mountable to the vehicle; and
   an attaching portion arranged with the bracket and configured so that the tank is movable when the tank receives an impact force thereto larger than a predetermined value;
   the attaching portion comprises a boss portion fixable to the vehicle and a flange portion arranged around the boss portion and connected to the tank;
   the flange portion being movable with respect to the boss portion so as to absorb the impact force to the tank;
   wherein the attaching portion comprises a plurality of rib portions connecting the boss portion to the flange portion;
   the rib portions are spaced apart circumferentially with cavities formed therebetween and lie in a same plane as said flange portion and are fracturable so that the tank is movable with respect to the vehicle when the tank is impacted; and
   wherein the attaching portion further comprises a plurality of thin plane portions that connect the boss portion to the flange portion and are arranged between the rib portions; and
   the thin plane portions are fracturable so that tank is movable with respect to the vehicle when the tank is impacted.

3. A fluid reservoir comprising:
   a reservoir tank for holding a fluid therein, said tank being positionable at an upper portion of an engine compartment of a vehicle;
   a bracket connected with the tank and being connectable to the vehicle;
   an attaching portion arranged with the bracket and being fixable to the vehicle; and
   a connecting portion arranged with the bracket to connect the attaching portion to the tank and being configured so that the tank is movable with respect to the vehicle to absorb an impact force that acts on the tank when the tank receives an impact force larger than a predetermined value, said connecting portion having rib portions defining a concavity therebetween;
   wherein the connecting portion comprises a notch portion that is defined as a portion with section modules in a longitudinal direction which are smaller than other portions of the connecting portion so as to have a decreased thickness, wherein a longitudinal location of a vertex of said notch corresponds with a location of one of the rib portions of the connecting portions; and
   the notch portion is fracturable so that the tank is movable with respect to the vehicle when the tank is impacted.

4. A fluid reservoir comprising:
   a reservoir tank for holding a fluid therein, said tank being positionable at an upper portion of an engine compartment of a vehicle;
   first and second brackets connected with the tank so as to be installable in a vehicle;
   a first attaching portion arranged with the first bracket and configured so that the tank is movable in a horizontal direction of the vehicle to absorb an impact force that acts on the tank in the horizontal direction when the tank receives an impact force larger than a predetermined value; and
   a second attaching portion arranged with the second bracket and configured so that the tank is movable in a vertical direction to absorb an impact force that acts to the tank in the vertical direction when the tank receives an impact force larger than the predetermined value, wherein:
   the first and second attaching portion each comprises a boss portion fixable to the vehicle and a flange portion arranged around the boss portion and connected to the tank;
   the flange portion being moveable with respect to the boss portion so as to absorb the impact force to the tank;
   the second attaching portion comprises a plurality of rib portions formed in said flange for connecting the boss portion to the flange portion;
   the rib portions being fracturable so that the tank is movable with respect to the vehicle when the tank is impacted, said rib portions being spaced apart circumferentially with cavities formed therebetween and lie in a same plane as said flange portion;
   the first attaching portion further comprising a plurality of thin plane portions formed in said flange so as to reduce a thickness portion thereof that are connecting the boss portion to the flange portion and are arranged between the rib portions; and
   the thin plane portions are also fracturable so that the tank is moveable with respect to the vehicle when the tank is impacted.

5. A fluid reservoir comprising:

a reservoir tank for holding a fluid therein; said tank being positionable at an upper portion of an engine compartment of a vehicle;

first and second brackets connected with the tank so as to be installed in the vehicle;

a first attaching portion arranged with the bracket so as to be fixable to the vehicle;

a first connecting portion arranged with the first bracket so as to connect the first attaching portion to the tank and configured so that the tank is movable with respect to the vehicle to absorb an impact force that acts on the tank when the tank receives an impact force larger than a predetermined value; and a second attaching portion arranged with the second bracket and configured so that the tank is movable with respect to the vehicle to absorb an impact force that acts on the tank when the tank receives an impact force larger than the predetermined value, wherein:

the first and second attaching portion each comprises a boss portion fixable to the vehicle and a flange portion arranged around the boss portion and connected to the tank;

the flange portion being moveable with respect to the boss portion so as to absorb the impact force to the tank;

the second attaching portion comprises a plurality of rib portions formed in said flange for connecting the boss portion to the flange portion;

the rib portions being fracturable so that the tank is movable with respect to the vehicle when the tank is impacted, said rib portions being spaced apart circumferentially with cavities formed therebetween and lie in a same plane as said flange portion;

the first attaching portion further comprising a plurality of thin plane portions formed in said flange so as to reduce a thickness portion thereof that are connecting the boss portion to the flange portion and are arranged between the rib portions; and the thin plane portions are also fracturable so that the tank is moveable with respect to the vehicle when the tank is impacted.

6. A reservoir according to claim 5, wherein:

the first connecting portion comprises a notch portion with section modules in a longitudinal direction which are smaller than other portions of the first connecting portion; and the second attaching portion comprises a boss portion fixable to the vehicle, a flange portion arranged around the boss portion and connected to the tank, and a plurality of rib portions connecting the boss portion to the flange portion.

7. A reservoir according to claim 6, wherein:

the notch is deformable or fracturable so that the tank is movable with respect to the vehicle; and the rib portion is deformable or fracturable so that the tank is movable with respect to the vehicle when the tank is impacted.

* * * * *